United States Patent
Cook et al.

(10) Patent No.: US 7,978,124 B2
(45) Date of Patent: Jul. 12, 2011

(54) METHOD AND SYSTEM FOR MOTION COMPENSATION FOR HAND HELD MTI RADAR SENSOR

(75) Inventors: Carl D. Cook, La Habra, CA (US); Scott E. Adcook, Irvine, CA (US); Mena J. Ghebranious, Cerritos, CA (US)

(73) Assignee: Raytheon Company, Waltham, MA (US)

( * ) Notice: Subject to any disclaimer, the term of this patent is extended or adjusted under 35 U.S.C. 154(b) by 73 days.

(21) Appl. No.: 12/462,366

(22) Filed: Aug. 3, 2009

(65) Prior Publication Data

US 2011/0025545 A1 Feb. 3, 2011

(51) Int. Cl.
*G01S 13/52* (2006.01)
(52) U.S. Cl. .......................... 342/160; 342/22; 342/161
(58) Field of Classification Search ........... 342/159–164
See application file for complete search history.

(56) References Cited

U.S. PATENT DOCUMENTS

| | | | |
|---|---|---|---|
| 5,731,781 A * | 3/1998 | Reed | 342/135 |
| 5,760,734 A * | 6/1998 | Urkowitz | 342/159 |
| 6,466,155 B2 | 10/2002 | Taylor et al. | |
| 6,559,932 B1 * | 5/2003 | Halmos | 356/5.03 |
| 6,970,128 B1 | 11/2005 | Dwelly et al. | |
| 7,259,716 B1 * | 8/2007 | Dubbert et al. | 342/194 |
| 2004/0125835 A1 * | 7/2004 | Halmos | 372/26 |
| 2005/0128123 A1 | 6/2005 | Greneker, III et al. | |
| 2006/0028369 A1 | 2/2006 | Rausch et al. | |
| 2007/0132634 A1 | 6/2007 | Wakeman | |
| 2007/0171119 A1 * | 7/2007 | Dwelly et al. | 342/28 |
| 2008/0304044 A1 * | 12/2008 | Cooper et al. | 356/5.15 |

OTHER PUBLICATIONS

Written Opinion of the International Searching Authority for International Application No. PCT/US2010/044297, filed Aug. 3, 2010, Written Opinion dated Nov. 5, 2010 and mailed Nov. 16, 2010 (7 pgs.).
International Search Report for International Application No. PCT/US2010/044297, filed Aug. 3, 2010, International Search Report dated Nov. 5, 2010 and mailed Nov. 16, 2010 (3 pgs.).

* cited by examiner

*Primary Examiner* — Thomas H Tarcza
*Assistant Examiner* — Timothy A Brainard
(74) *Attorney, Agent, or Firm* — Christie, Parker & Hale, LLP

(57) ABSTRACT

Methods to quantify the amount of radial platform motion of a portable sensor are described. In an exemplary embodiment, the method uses the frequency domain phase data in the range bin corresponding to a large stationary object. A correction factor is computed and applied back into the time domain samples prior to processing by Doppler filters used to measure motion in the scene.

20 Claims, 4 Drawing Sheets

METHOD AND SYSTEM FOR MOTION COMPENSATION FOR HAND HELD MTI RADAR SENSOR

This invention was made with Government support under Contract No. W15P7T-05-C-P616 awarded by the Department of the Army. The Government has certain rights in this invention.

BACKGROUND

Low frequency hand held Moving Target Indicator (MTI) radars can be used in urban combat to gain situational awareness by locating personnel through dense obstructions such as walls. It is desirable that these sensors be small, lightweight, and low power. It is also highly desirable that they operate as hand held devices. However, such a radar device is very sensitive to small platform motions that are a result of hand held usage.

It has generally been accepted that highly sensitive sense through the wall (STTW) radars must be physically stationary to detect human targets exhibiting very slow and small movement such as postural sway or respiration. Typical means of stabilization for hand held devices have included pressing the device up against a wall through which the user is interested in gaining information. Stand-off sensors have typically been mounted on tripods or on stationary manned or unmanned robotic vehicles.

Typical approaches for radar motion compensation include the use of inertial sensors such as accelerometers to measure sensor displacement over time. In an STTW application, radial motion compensation accuracy to millimeter levels may support the detection of very slow and small movements associated with human postural sway or respiration. A hand held STTW sensor will typically exhibit small random radial motion consistent with the postural sway of the user. This small motion is difficult to accurately measure through the use of inertial sensing technology that meets the size and power requirement of the hand held STTW sensor application.

SUMMARY OF THE DISCLOSURE

A method and a system to quantify the amount of radial platform motion of a portable sensor are described. In an exemplary embodiment, the frequency domain phase data in the range bin corresponding to a wall or other large stationary object is used. A correction factor is computed and applied back into the time domain samples prior to processing by Doppler filters used to measure motion in the scene.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 1:
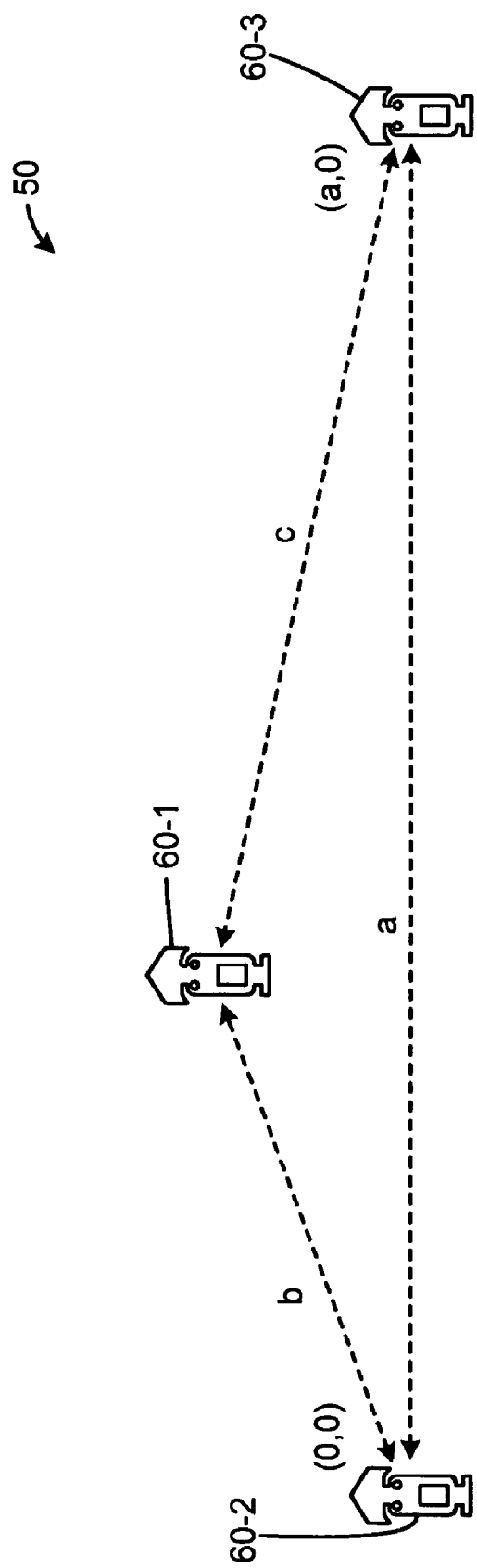
FIG. 1 diagrammatically illustrates an exemplary sensor network of distributed sensor nodes.

In the following detailed description and in the several figures of the drawing, like elements are identified with like reference numerals. The figures are not to scale, and relative feature sizes may be exaggerated for illustrative purposes.

Exemplary methods to quantify the amount of radial platform motion of a portable radar sensor are described. In an exemplary embodiment, the method uses the frequency domain phase data in the range bin corresponding to the wall or other large stationary object. A correction factor proportional to the amount of radial sensor motion is computed and applied back into the time domain samples prior to processing by Doppler filters used to measure motion in the scene.

An exemplary application is for MTI radar motion compensation, and for use in the specific application of mobile or man-portable battery operated hand held STTW radars. An exemplary STTW radar system may involve a single stand-alone radar sensor or a plurality of distributed mobile sensors or sensor nodes, with the plurality of sensor nodes forming a sensor network. FIG. 1 diagrammatically illustrates an exemplary sensor network 50, including distributed sensor nodes 60-1, 60-2 and 60-3. Each sensor node is typically associated with a sensor system which may be portable or mobile, and its position in relation to the other nodes may change as a function of time. For an STTW radar application, each sensor node may be a hand-held or vehicle mounted radar sensor system or may be one of several in a system forming part of a distributed aperture.

Figure 2:
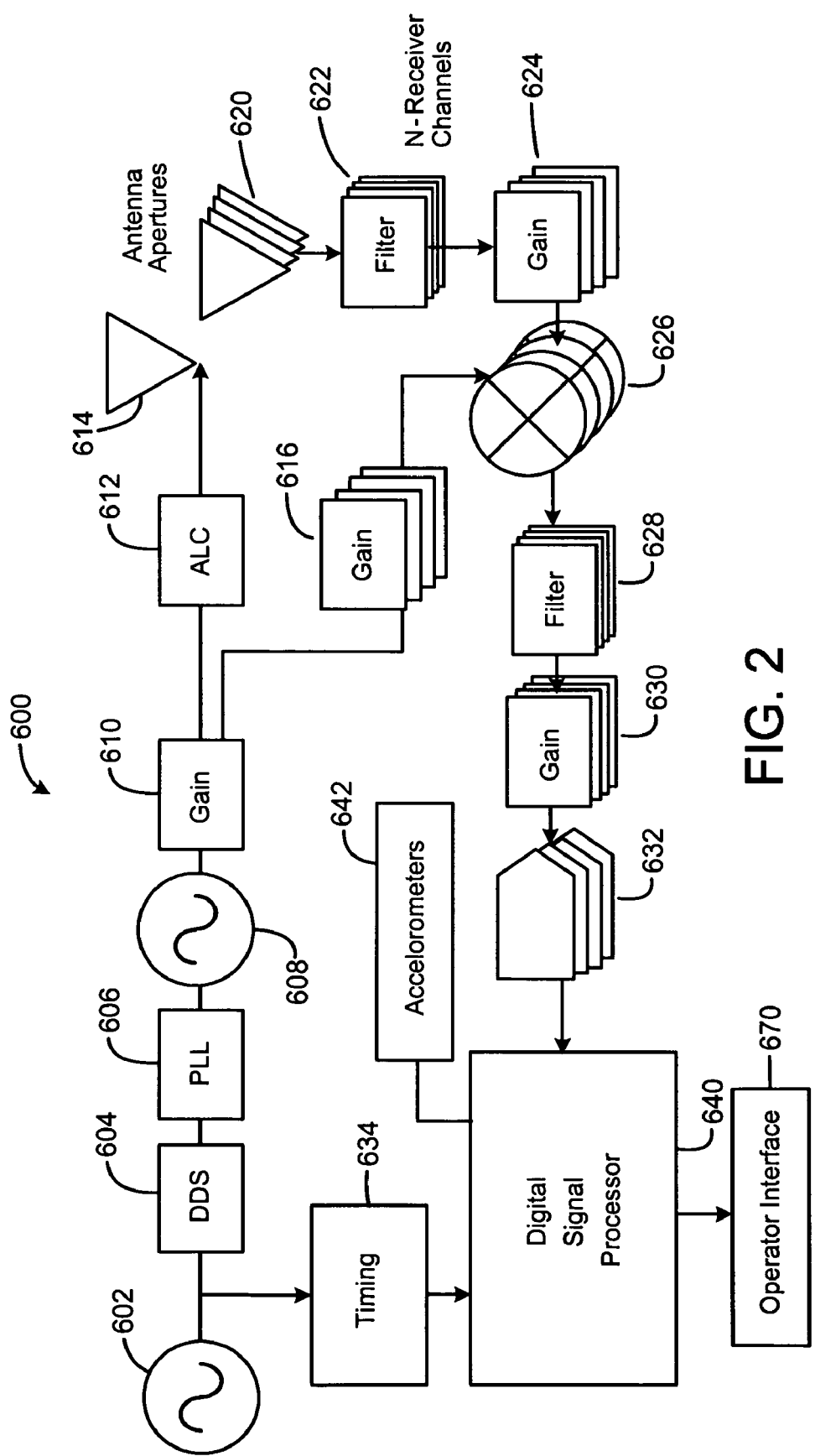
FIG. 2 is a simplified schematic block diagram of aspects of an exemplary sensor node.

FIG. 2 depicts a simplified schematic diagram of an exemplary STTW sensor node 600. The node includes an oscillator 602 which is connected to a waveform generator 604, 606, 608, and to a timing circuit 634. The oscillator 602 serves as the low noise master reference clock for the radar. The waveform generator in this exemplary embodiment includes a low power digitally programmable Direct Digital Synthesizer (DDS) 604 which generates a low frequency linear frequency modulated (FM) chirp with the desired frequency change and sweep rate. This low frequency chirp is then multiplied by a Phase Locked Loop (PLL) 606 with a Voltage Controlled Oscillator (VCO) 610 up to the desired transmit frequency. Gain circuit 610 amplifies the transmit signal, and the amplified signal is passed through an automatic level circuit (ALC) 612 to the transmit antenna 614. The transmit signal from gain circuit 612 is also passed through another gain circuit 616 to a mixer circuit 626 in the receiver. The transmitter operates, in exemplary embodiments, at L band or S band frequencies, and generally at operating frequencies less than about 5 GHz.

Still referring to FIG. 2, the sensor node 600 further includes antenna apertures 620 which feed multiple receive channels including filters 622. Gain circuits 624 amplify the outputs of the filters 622, and the amplified receive signals are mixed with the versions of the transmit signals at mixer circuits 626 to provide downconverted receive signals which are filtered by filters 628, amplified by gain circuits 630, and converted to digital signals by analog-to-digital converters 632. The digitized signals are received by the digital signal processor 640, which processes the signals to provide radar target information.

Motion compensation corrections for radial motion of the sensor caused by postural sway or respiration of the user, in an exemplary embodiment, may be derived strictly from radar data at a range bin that is determined to contain large stationary clutter with no moving targets, typically a building wall.

The baseband equation is:

$$b(t)=\cos(w_b t+\theta_b)$$

Where: $w_b=(\Delta w/\Delta t)*t_d$; $\theta_b=w_{start}*t_d$ $\Delta w$=FM frequency sweep $\Delta t$=FM sweep interval $w_{start}$=FM chirp start frequency With no platform motion:

$t_d=2R/c$ (round trip time delay from tx to rx)

With platform motion of $\Delta R$:

$t_d=2(R+\Delta R)/c$

Platform motion is described as radial motion because the radar inherently measures radial range to targets within the antenna beam coverage.

$\Delta R$ can be represented as zero mean Gaussian range noise. The quality of motion compensation is limited to how closely the proposed solution can estimate the actual $\Delta R$ value.

In an exemplary embodiment, the baseband equation is rewritten as follows:

$$b(t)=\cos[w_b(R)t+w_b(\Delta R)t+\theta_b(R)+\theta_b(\Delta R)]$$

An accurate measurement of $\Delta R$ can be used to correct each range bin for platform motion. $\Delta R$ may be solved for, using the following technique. For a system with platform motion, a large stationary object (i.e. a front wall) will have a non-constant $\theta_b(\Delta R)$ value, i.e., the phase changes at the object over time due to the platform motion. In this embodiment, the range bin corresponding to a wall or other large object is identified on the basis of its large amplitude in the frequency domain data, or the range compressed data. The phase response at the reference range bin is a combination of the baseband phase and the phase response of the FFT used in the range compression operation. To compute the correction factor to apply to the time domain data, the baseband phase response can be computed from the composite phase response expressed as:

$$\theta_b(R)=\theta_{FFT\_Ref\_Bin}(R)+\theta_{FFT}(R)$$

In this embodiment, the constant phase slope contribution, $\theta_{FFT}(R)$ is calculated using a linear regression to determine the fitted line corresponding to the FFT phase versus range in the form mR+b. The baseband phase can be expressed as:

$$\theta_b(R)=mR+b+\theta_{FFT\_Ref\_Bin}(R)$$

To obtain the phase correction corresponding to the platform motion the phase difference relative to an initial value is computed as:

$$\theta_b(\Delta R)=\Delta\theta_{FFT\_Ref\_Bin}+m$$

Therefore, $\Delta R$ is measured as follows:

$$\Delta R=(\theta_b(\Delta R)*c)/(w_{start}*2)=(\Delta\theta_{FFT\_Ref\_Bin}+m)*c/(w_{start}*2)$$

A correction is applied as a $e^{-j\Delta t}$ complex multiply of the original baseband signal:

Where: $\Delta t=(\Delta w/\Delta t)*2\Delta R/c+(w_{start}*2\Delta R/c)$ or rewritten in simpler format:

$$\Delta\theta(t) = \frac{2\Delta R}{c}\left(w_{start} + \frac{\Delta W}{\Delta T}t\right)$$

Therefore: $b_{comp}(t)=b_{orig}(t)*e^{-j\Delta\theta(t)}$

An exemplary embodiment of the method provides the ability to detect a large stationary object in an antenna sum channel which is boresight to the sensor. Non-radial components of platform motion are not compensated; however these component result in little degradation to the radar's sensitivity to detect a moving target's radial velocity.

Figure 3:
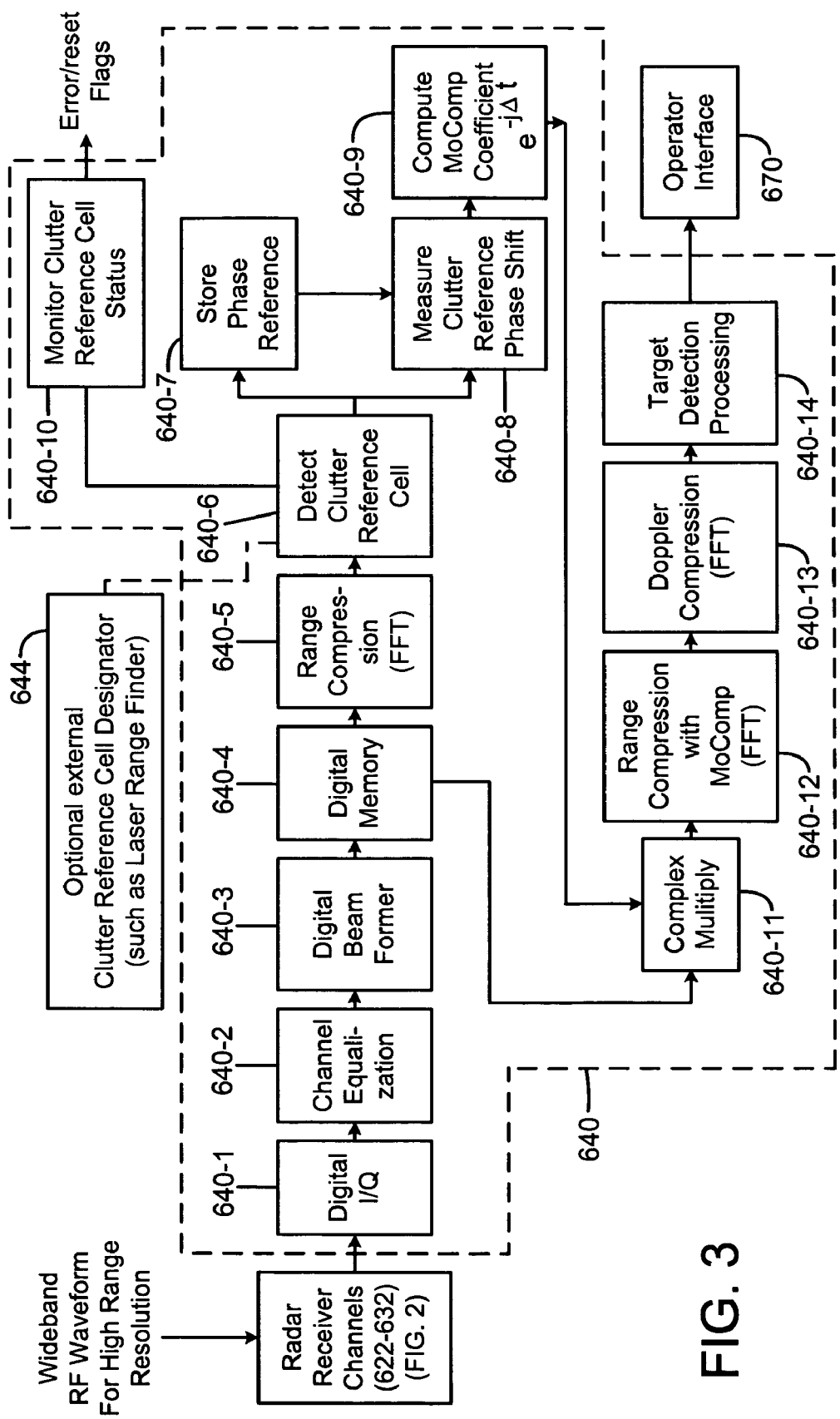
FIG. 3 is a schematic block diagram, illustrating functions provided by an exemplary embodiment of a radar processor employing motion compensation.

FIG. 3 is a schematic block diagram, illustrating functions provided by an exemplary embodiment of a radar processor such as DSP 640 employing motion compensation. The received signals from the antenna array are passed to the respective receive channels, and digitized by ADCs 632-1, 632-N. The DSP 640 processes the digitized received radar return signals to detect moving targets, in this embodiment, and can provide the target detection results to an operator by an operator interface 670, which may include a display for displaying the target detection results as well as controls for operating the sensor node.

The DSP 640 includes digital I/Q and channel equalization functions 640-1 and 640-2 which provide complex time samples of the radar return signals. The complex time samples are processed by a digital beamformer 640-3 and are stored in memory at 640-4. The resulting data is processed by range compression FFT function 640-5, and a clutter reference cell is detected from the range bins at 640-6 for use in the motion compensation function. An initial phase reference is stored at 640-7. The clutter reference phase shift is measured or calculated at 640-8, and used to calculate the motion compensation coefficient or correction factor at 640-9. At 640-11, the original complex time samples are complex multiplied by multiplier 640-11, and the new motion-compensation complex time samples are processed by the range compression block 640-12, the Doppler compression 640-13, and target detection processing 640-14. The output of the target detection processing is provided to the operator interface 670.

In an exemplary embodiment, the radial motion correction factors are calculated for each beamformer output channel. In one embodiment, the clutter reference cell is determined using a detector operating on the sum beam from the beamformer block, 650-3. In other embodiments, this range cell determination can be made or aided by external inputs such as that from a laser range finder. Thus, for the example illustrated in FIG. 3, function blocks 640-1, 640-2, 640-3, 640-4, 640-5, 640-7, 640-8, 640-9, 640-11, 640-12, 640-13, and 640-14 operate on each channel.

This exemplary embodiment of the radar sensor utilizes wideband linear frequency modulated pulses to achieve high range resolution. The receiver features stretch processing to de-chirp the received FM radar echoes. Due to the linear FM sweep, the de-chirped waveform features a one-to-one correspondence between range (time delay) and frequency offset from DC. The range compression functions (640-5, 640-12) are implemented with Fast Fourier Transform (FFT) functions that act like a bank of matched filters for each range. To measure target velocities at each range, the Doppler compression block 640-13 performs a two dimensional (2D) FFT over each range bin over a given coherent processing interval. At the output of the Doppler compression, an adaptive threshold is calculated for each range-Doppler bin using a "lesser-of" constant false alarm rate threshold algorithm. This algorithm adaptively adjusts the detection threshold for each range bin based on the noise, clutter, and interference measured in adjacent range bins. For any range-Doppler bin where a threshold crossing is determined, the angle is determined using a phase monopulse calculation and the range, angle, and velocity data is forwarded to a Kalman tracking filter in the target detection processing 640-14. The output of the Kalman tracking filter of the MTI detection and tracking function 640-14 is supplied to the operator display interface 670.

Figure 4:
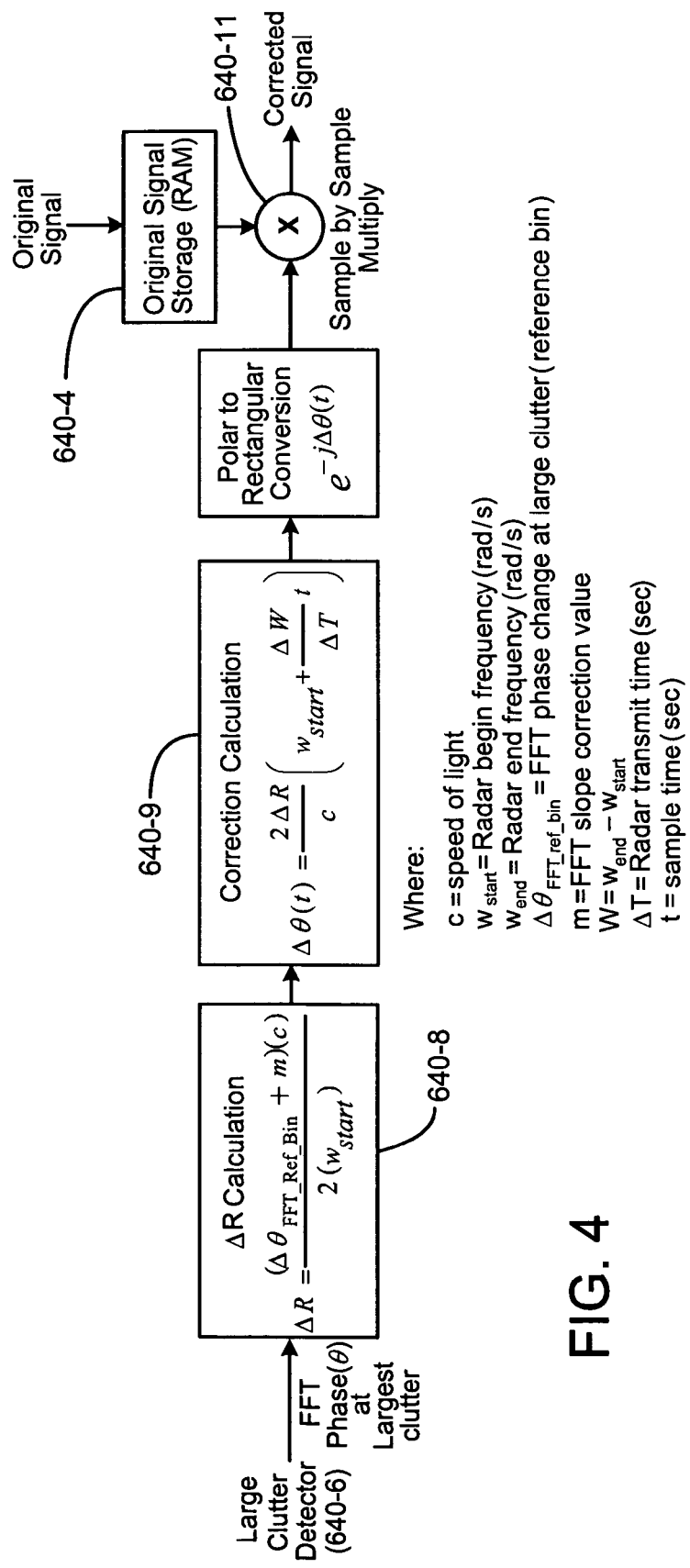
FIG. 4 illustrates an exemplary embodiment of a motion compensation function in a radar processor.

FIG. 4 illustrates an exemplary embodiment of motion compensation functions in a radar processor such as the DSP 660. The signal samples from the receiver channel, designated "Original signal" in FIG. 4, are stored in memory 640-4, and are multiplied sample-by-sample with the correction factor at multiplier 640-11. The motion compensation function also receives a data signal from the large clutter detector, the phase θ at the largest clutter, which is a return from a large stationary object or mass, e.g. a wall. A ΔR calculation is performed by function 640-8 using the phase at the largest clutter. At function 640-9, a correction calculation is performed, using the results of the ΔR calculation. The correction factor which results from the calculation, Δθ(t), is converted to rectangular coordinates to provide the correction which is multiplied sample-by-sample at 640-11 with the original signal. The correction factor is calculated and applied on a pulse-by-pulse basis.

A method to quantify the amount of radial platform motion of a portable sensor has been described. In an exemplary embodiment, the frequency domain phase data in the range bin corresponding to a wall or other large stationary object is used. At each pulse, a phase correction factor is computed proportional to the amount of radial sensor motion that has occurred and applied back into the time domain samples prior to processing by Doppler filters used to measure motion in the scene. This approach significantly improves the motion compensation performance over long coherent integration intervals as compared to typical inertial measurement techniques and may result in smaller radar sensor size, weight, and power.

Although the foregoing has been a description and illustration of specific embodiments of the subject matter, various modifications and changes thereto can be made by persons skilled in the art without departing from the scope and spirit of the invention.

What is claimed is:

1. A method for measuring the amount of radial platform motion of a handheld portable Moving Target Indicator (MTI) radar sensor, comprising:
    transmitting a series of radar pulses at frequencies less than about 5 GHz;
    processing radar return signals resulting from said series of radar pulses to develop frequency domain data in a plurality of range bins, including frequency domain phase data in a range bin corresponding to a large stationary object in a scene under surveillance;
    computing a radial correction factor based on the frequency domain phase data for the range bin corresponding to the large stationary object, said radial correction factor indicative of radial motion of the sensor caused by postural sway or respiration of a user; and
    applying the radial correction factor to time domain samples of the radar return signals prior to processing by Doppler filters used to measure motion in the scene, to compensate for the radial motion of the radar sensor caused by the user.

2. The method of claim 1, wherein:
    said computing a radial correction factor includes computing a radial correction factor on a pulse-by-pulse basis.

3. The method of claim 2, wherein said applying said correction factor includes applying the computed radial correction factor on a pulse-by-pulse basis.

4. The method of claim 1, further comprising:
    determining a clutter reference bin as said range bin corresponding to a large stationary object.

5. The method of claim 4, wherein said determining a clutter reference bin includes detecting said clutter reference bin from said plurality of range bins.

6. The method of claim 4, wherein said determining a clutter reference bin comprises designating the clutter reference bin using an external designator device.

7. The method of claim 1, wherein said transmitting a series of radar pulses comprises:
    generating a low frequency linear frequency modulated chirp signal;
    upconverting the chirp signal to a transmit frequency at L band or S band; and
    transmitting the unconverted chirp signal.

8. A method for compensating for radial platform motion of a portable handheld Moving Target Indicator (MTI) radar sensor due to user postural sway or respiration, comprising:
    transmitting a series of L-band or S-band radar pulses;
    receiving radar return signals at antenna apertures which feed a plurality of receiver channels;
    digitizing the radar return signals resulting from the transmitted pulses;
    storing time domain samples of the digitized radar return signals;
    processing the digitized radar return signals to develop frequency domain data in a plurality of range bins, including frequency domain phase data in a range bin corresponding to a large stationary object in a scene under surveillance;
    for one of said receiver channels, computing a radial correction factor based on the frequency domain phase data for the range bin corresponding to the large stationary object, said radial correction factor indicative of radial motion of the sensor caused by postural sway or respiration of the user;
    applying the radial correction factor to said stored time domain samples of the digitized radar return signals for each of the receiver channels; and
    processing the corrected stored time domain samples of the digitized radar return signals by Doppler filters to measure motion in the scene and detect moving targets.

9. The method of claim 8, wherein said large stationary object is a wall.

10. The method of claim 8, wherein:
    said computing a radial correction factor includes computing a radial correction factor on a pulse-by-pulse basis.

11. The method of claim 8, further comprising:
    determining a clutter reference bin as said range bin corresponding to a large stationary object.

12. The method of claim 11, wherein said determining a clutter reference bin comprises designating the clutter reference bin using an external designator device.

13. The method of claim 8, wherein said transmitting a series of L-band or S-band radar pulses comprises:
    generating a low frequency linear frequency modulated chirp signal;
    upconverting the chirp signal to a transmit frequency at L band or S band; and
    transmitting the upconverted chirp signal.

14. A portable hand-held Moving Target Indicator (MTI) radar sensor, comprising:
    a transmitter for transmitting a series of radar pulses at L-band or S-band;

a radar receiver for generating time domain signals representative of radar return signals from a plurality of receiver channels;

a radar signal processor, comprising:

a digital data memory for storing digitized samples of the time domain signals representative of the radar return signals;

processing means for processing the digitized samples of the time domain signals to develop frequency domain data in a plurality of range bins, including frequency domain phase data in a range bin corresponding to a large stationary object in a scene under surveillance;

means for computing a radial correction factor based on the frequency domain phase data for the range bin corresponding to the large stationary object, said radial correction factor indicative of radial motion of the sensor caused by postural sway or respiration of a user;

means for applying the radial correction factor to said stored digitized samples of the time domain signals; and means for processing the corrected stored digitized samples of the time domain signals by Doppler filters to measure motion in the scene and detect moving targets.

15. The sensor of claim 14, wherein said means for computing a radial correction factor is configured to compute a radial correction factor for one of said plurality of receiver channels.

16. The sensor of claim 15, wherein said means for applying the radial correction factor comprises applying the radial correction factor computed for said one of said plurality of receiver channels to stored time domain samples of the radar return signals for each of said plurality of receiver channels.

17. The sensor of claim 16, wherein said transmitter comprises:

a direct digital synthesizer configured to generate a low frequency linear frequency modulated chirp signal; and a multiplier circuit with a phase locked loop and a voltage controlled oscillator to upconvert the chirp signal to a transmit frequency at L band or S band.

18. The sensor of claim 14, wherein said means for applying the radial correction factor comprises means for multiplying the stored digitized samples of the time domain signals by said radial correction factor.

19. The sensor of claim 14, wherein said means for computing a radial correction factor is configured to compute the radial correction factor on a pulse-by-pulse basis.

20. The sensor of claim 19, wherein said means for applying said correction factor is configured to apply the computed radial correction factor on a pulse-by-pulse basis.

* * * * *

UNITED STATES PATENT AND TRADEMARK OFFICE
CERTIFICATE OF CORRECTION

Page 1 of 1

PATENT NO.       : 7,978,124 B2
APPLICATION NO.  : 12/462366
DATED            : July 12, 2011
INVENTOR(S)      : Carl D. Cook et al.

It is certified that error appears in the above-identified patent and that said Letters Patent is hereby corrected as shown below:

In the Claims

Column 6, Claim 7, line 16          Delete "unconverted"
                                    Insert -- upconverted --

Signed and Sealed this
First Day of May, 2012

David J. Kappos
*Director of the United States Patent and Trademark Office*